US008515792B2

(12) United States Patent
Agarwala et al.

(10) Patent No.: US 8,515,792 B2
(45) Date of Patent: Aug. 20, 2013

(54) METHOD AND SYSTEM FOR CHARGEBACK ALLOCATION IN INFORMATION TECHNOLOGY SYSTEMS

(75) Inventors: Sandip Agarwala, Sunnyvale, CA (US); Ramani R. Routray, San Jose, CA (US); Sandeep M. Uttamchandani, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 596 days.

(21) Appl. No.: 12/567,538

(22) Filed: Sep. 25, 2009

(65) Prior Publication Data

US 2011/0077997 A1     Mar. 31, 2011

(51) Int. Cl.
*G06Q 10/00* (2006.01)

(52) U.S. Cl.
USPC ....... 705/7.11; 705/7.35; 705/7.22; 705/7.36; 705/410

(58) Field of Classification Search
None
See application file for complete search history.

(56) References Cited

U.S. PATENT DOCUMENTS

| | | | |
|---|---|---|---|
| 5,946,661 A | 8/1999 | Rothschild et al. | |
| 6,556,976 B1 | 4/2003 | Callen | |
| 6,609,113 B1 | 8/2003 | O'Leary et al. | |
| 6,938,027 B1 | 8/2005 | Barritz et al. | |
| 6,999,943 B1 | 2/2006 | Johnson et al. | |
| 7,167,844 B1 | 1/2007 | Leong et al. | |
| 7,194,439 B2* | 3/2007 | Kassan et al. | 705/51 |
| 7,308,414 B2 | 12/2007 | Parker et al. | |
| 7,904,909 B1* | 3/2011 | Reiner et al. | 718/104 |
| 7,996,820 B2* | 8/2011 | Auvenshine et al. | 717/127 |
| 8,065,206 B2* | 11/2011 | Thomas | 705/34 |
| 8,250,582 B2* | 8/2012 | Agarwala et al. | 718/104 |
| 2002/0161717 A1* | 10/2002 | Kassan et al. | 705/59 |
| 2002/0194045 A1* | 12/2002 | Shay et al. | 705/8 |
| 2003/0050788 A1 | 3/2003 | Cranner | |
| 2003/0083912 A1 | 5/2003 | Covington, III et al. | |
| 2003/0158768 A1 | 8/2003 | Maeda | |
| 2004/0044551 A1 | 3/2004 | Keefe et al. | |
| 2006/0111874 A1* | 5/2006 | Curtis et al. | 702/186 |
| 2007/0213992 A1* | 9/2007 | Anderson et al. | 705/1 |
| 2008/0167977 A1* | 7/2008 | Auvenshine et al. | 705/34 |
| 2008/0288377 A1* | 11/2008 | Koukis | 705/30 |
| 2009/0164356 A1* | 6/2009 | Bakman | 705/34 |
| 2009/0292654 A1* | 11/2009 | Katiyar et al. | 705/412 |
| 2010/0036698 A1* | 2/2010 | Garrison et al. | 705/8 |
| 2010/0223166 A1* | 9/2010 | Wallace et al. | 705/30 |

OTHER PUBLICATIONS

Agarwala, S.; Routray, R.; Uttamchandani, S.; , "ChargeView: An integrated tool for implementing chargeback in IT systems," Network Operations and Management Symposium, 2008. NOMS 2008. IEEE , vol., No., pp. 371-378, Apr. 7-11, 2008.*

(Continued)

*Primary Examiner* — Brett Feeney
(74) *Attorney, Agent, or Firm* — Kenneth L. Sherman, Esq.; Michael Zarrabian, Esq.; Sherman & Zarrabian LLP

(57) ABSTRACT

The invention provides a system and method for chargeback cost allocation in an information technology (IT) system including multiple resources. The method includes categorizing cost attributes of different resources into multiple levels defining a cost attribute hierarchy, defining different chargeback groups for resources with similar cost attributes and chargeback policies at different levels of the hierarchy, and performing chargeback cost allocation by allocating the cost for resources at each hierarchy level independently using chargeback policies defined for the resources at that hierarchy level.

14 Claims, 7 Drawing Sheets

(56) References Cited

OTHER PUBLICATIONS

Ooi, G., et al., An Activity Based Costing Approach to Systems Development and Implementation, Int'l Conf. on Info Systems, 1998, pp. 341-345, Assoc. for Info Systems, Atlanta, GA.

O'Bryan, C., Online and Instructor-Led Technical Training: A Charge-Back Model that Works! SIGUCCS, Nov. 2005, pp. 266-269, AMC, New York, NY.

Sridhar, M., et al., A Contingency Model for Mapping Chargeback Systems to Information System Environments, Proceedings of the 1993 conference on Computer personnel research, 1993, pp. 206-213, ACM, New York, NY.

Gerlach, J., et al., Determining the Cost of IT Services, Communications of the ACM, Sep. 2002, pp. 61-67, vol. 45, No. 9, ACM, New York, NY.

Agarwala, S., et al., ChargeView: An Integrated Tool for Implementing Chargeback in IT Systems, Network Operations and Mgmt. Symposium, Apr. 2008, pp. 371-378, Salvador, Bahia.

Tallon et al., "Information Life Cycle Management," Communications of the ACM, vol. 50, No. 11, Nov. 2007, pp. 65-69, ACM, New York, NY.

Hirschheim et al., "The Myths and Realities of Information Technology Insourcing," Communications of the ACM, vol. 43, No. 2, Feb. 2000, pp. 99-107, ACM, New York, NY.

EDP Analyzer, "The Effects of Charge-Back Policies," EDP Analyzer, vol. 11, No. 11, Nov. 1973, pp. 1-14, Canning Publications, Inc., USA.

D.H. Drury, "The Enigma of Chargeback Systems," Capacity Management Review, vol. 25, No. 1, Jan. 1997, pp. 1, 16-22, USA.

McKinnon et al., "Mapping Chargeback Systems to Organizational Environments," MIS Quarterly: Management Information Systems, vol. 11, No. 1, Mar. 1987, pp. 5-20, USA.

D.H. Drury, "Conditions Affecting Chargeback Effectiveness," Information and Management, vol. 5, No. 1, Mar. 1982, pp. 31-36, North Holland Publishing Company, New York.

* cited by examiner

METHOD AND SYSTEM FOR CHARGEBACK ALLOCATION IN INFORMATION TECHNOLOGY SYSTEMS

BACKGROUND OF THE INVENTION

1. Field of the Invention

The present invention relates generally to chargeback cost allocation, and in particular, to chargeback allocation based on a multi-level hierarchy of categorized cost attributes for grouped resources.

2. Background Information

Most organizations are becoming increasingly reliant on information technology (IT) product and services to manage their daily operations. The total cost of ownership (TCO), which includes the hardware and software purchase cost, management cost, etc., has significantly increased and forms one of the major portions of the total expenditure for organizations. Chief Information Officers (CIOs) have been struggling to justify the increased costs and at the same time fulfill the IT needs of their organizations. For businesses to be successful, these costs need to be carefully accounted for and attributed to specific processes or user groups/departments responsible for the consumption of IT resources. This process is called IT chargeback and although desirable, is hard to implement because of the increased consolidation of IT resources via technologies, such as virtualization. Current IT chargeback methods are either too complex or too adhoc, and often at times lead to unnecessary tensions between IT and business departments and fails to achieve the goal for which chargeback was implemented.

Implementing chargeback in IT systems gives rise to multiple technical challenges: First, the magnitude of complexity in providing IT services is mammoth as compared to generation and distribution of electricity. There are large numbers of resources that are shared in a complex fashion to provide useful service to the end-users. Second, these users can have different usage patterns and they may use resources with different levels and quality of services. Keeping track of end-to-end usage for every workload and every deployed resource can impose considerable monitoring overhead. Third, a significant portion of these resources may become idle depending on demand, time of day, etc. These idle resources, however, still incur some costs during the idle periods. Fourth, there are a large number of expenditures ranging from hardware/software purchase costs to enterprise-wide costs, such as rental, security, energy, cooling, etc. Asset costs may depreciate over their useful life. A major fraction of the total cost includes management and support costs. These costs are spread across an entire enterprise system and it's typically non-trivial to attribute them to one function or end-user. Finally, one cost allocation policy cannot fit all IT expenses and workloads, and the goals of every IT providers. Depending on the type and cost of a resource, there may be more than one policy that determines its allocation and these policies may use multiple metrics (such as usage, provisioning and performance data) to compute the final chargeback. Also, depending on whether the provider is delivering IT service to in-house customers or external clients, the goal of chargeback may be different. The former is more concerned about regulating IT resource usage and cost recovery. The latter's goal is to set a competitive price and increase profits.

Chargeback is often confused with IT service pricing, which determines how much customers (usually "external") pay to the service providers such as SSP (Storage Service Provider) or ISP (Internet Service Provider). These pricing forms the part of Service Level Agreements (SLAs) and are associated with high level performance and quality attributes (such as maximum response time, minimum throughput, no single point of failure, etc.) that the service provider guarantees to deliver. Chargeback on the other hand is a process to distribute IT expenses that have already been incurred by the enterprise; it can be loosely compared to billing of utilities like electricity, which has been successfully implemented for many years. One of the reasons for that success is that there is a clear (and in most cases fair) relationship behind the usages and charges. A chargeback policy that allocates the cost equally among all the households in a community is hardly going to succeed. Similarly, chargeback for IT systems cannot distribute costs among its users in an adhoc manner.

FIGS. 1 and 2 show two common approaches employed by the current chargeback tools like ITUAM (IBM Tivoli Usage and Accounting Manager), HP Storage Essentials Chargeback, Northern Storage chargeback, Teamquest chargeback software, etc.

FIG. 1 illustrates the variable rate scheme 100. Variable rate scheme 100 computes the chargeback rate by dividing the total expenses with the total usage at the end of a billing period. The variable rate scheme 100 recovers total expenses, but variable rate can lead to surprise and customer dissatisfaction.

FIG. 2 illustrates a fixed rate scheme 200. Fixed rate schemes set rates based on historical usage. Customers are aware of what they would be charged for their usages but providers may face the risk of over-allocation and under-allocation. Existing chargeback tools perform cost allocation based on some linear formulation of the historical usages. These existing chargeback tools lack sophisticated cost allocation methods that can correlate end-to-end performance data from multiple sources and give an accurate breakdown of total cost by attributing different expenses with the appropriate users or departments. Cost allocation policies need to be manually specified for every resource and it is usually non-trivial to choose the right usage metric for allocating costs. Also, the linear cost assignment doesn't leave much room for the system administrators to regulate the usage and cost of their IT resources. These administrators typically want to be prepared for future demands and expenses, and have enough control to regulate the users' behavior. Current chargeback tools, however, fail to provide such support.

SUMMARY OF THE INVENTION

The invention provides a system and method for chargeback cost allocation in an information technology (IT) system including multiple resources. The method includes categorizing cost attributes of different resources into multiple levels defining a cost attribute hierarchy, defining different chargeback groups for resources with similar cost attributes and chargeback policies at different levels of the hierarchy, and performing chargeback cost allocation by allocating the cost for resources at each hierarchy level independently using chargeback policies defined for the resources at that hierarchy level.

In one embodiment of the invention, performing chargeback cost allocation includes performing cost allocation based on user-defined cost-allocation policies wherein the chargeback rate is proportional to a level of usage by individual user. In another embodiment of the invention, performing chargeback cost allocation includes utilizing a weighted demand-based costing scheme that associates user-defined weights to different resources to compute cost allocation. In yet another embodiment of the invention, the method further including associating cost attributes with the resources and then categorizing cost attributes of different resources into multiple levels defining a cost attribute hierarchy. In still another embodiment of the invention, defining different chargeback groups further includes grouping together resources with similar cost attributes and chargeback policies representing costs at various levels of the hierarchy. In one embodiment of the invention, a final cost allocation is determined using a hierarchy of different chargeback policies. In this embodiment of the invention, the different chargeback policies comprise: cost allocation based on an agreed to cost structure, cost allocation based on an amount of provisioned resources, cost allocation based on actual volume usage, cost allocation based on usage and availability trends, where the trends are based on time of day and supply and demand for resources, and cost allocation based on an ability to access resources.

Another embodiment of the invention involves a system. The system includes a build module configured to form multiple levels defining a hierarchy based on a plurality of cost attributes of a plurality of resources in a network, a categorizing module configured to form a plurality of groups of the plurality of resources based on similar cost attributes and chargeback cost policies at different levels of the hierarchy, a first monitoring module configured to monitor resource use for the plurality of resources, a second monitoring module configured to monitor resource costs based on an agreed to cost structure, and a chargeback cost allocation module configured to allocate costs by allocating the cost for resources at each hierarchy level independently using chargeback policies defined for the resources at that hierarchy level.

In one embodiment of the invention, the chargeback cost allocation module is further configured to allocate chargeback costs based on user-defined cost-allocation policies where a chargeback rate is proportional to a level of usage by individual user. In another embodiment of the invention, the chargeback cost allocation module is further configured to allocate chargeback costs by utilizing a weighted demand-based costing scheme that associates user-defined weights to different resources to compute cost allocation. In yet another embodiment of the invention, the categorizing module is further configured to group together resources with similar cost attributes and chargeback policies representing costs at various levels of the hierarchy. In still another embodiment of the invention, the chargeback cost allocation module determines final cost allocation using a hierarchy of different chargeback policies. In one embodiment of the invention, the different chargeback policies comprise: cost allocation based on an agreed to cost structure, cost allocation based on an amount of provisioned resources, cost allocation based on actual volume usage, cost allocation based on usage and availability trends, where the trends are based on time of day and supply and demand for resources, and cost allocation based on an ability to access resources.

Yet another embodiment of the invention involves a computer program product for allocating chargeback costs in a network including a plurality of resources that causes a computer to categorize cost attributes of different resources into multiple levels defining a cost attribute hierarchy, define different chargeback groups for resources with similar cost attributes and chargeback policies at different levels of the hierarchy, and perform chargeback cost allocation by allocating the cost for resources at each hierarchy level independently using chargeback policies defined for the resources at that hierarchy level.

In one embodiment of the invention, the chargeback cost allocation includes performing cost allocation based on user-defined cost-allocation policies wherein chargeback rate is proportional to a level of usage by individual user. In another embodiment of the invention, the chargeback cost allocation includes utilizing a weighted demand-based costing scheme that associates user-defined weights to different resources to compute cost allocation. In yet another embodiment of the invention, the computer is further caused to associate cost attributes with the resources and then categorize cost attributes of different resources into multiple levels defining a cost attribute hierarchy. In still another embodiment of the invention, the define different chargeback groups further includes grouping together resources with similar cost attributes and chargeback policies representing costs at various levels of the hierarchy. In one embodiment of the invention, a final cost allocation is determined using a hierarchy of different chargeback policies. In this embodiment of the invention, the different chargeback policies comprise: cost allocation based on an amount of provisioned resources, cost allocation based on actual volume usage, cost allocation based on usage and availability trends, where the trends are based on time of day and supply and demand for resources, and cost allocation based on ability to access resources.

Still another embodiment of the invention provides a distributed enterprise center network. The distributed network includes a plurality of enterprise centers coupled to a network, and a chargeback cost allocation system configured to provide chargeback cost allocation for each of the plurality of enterprise centers. The chargeback cost allocation system including a build module configured to form multiple levels defining a hierarchy based on a plurality of cost attributes of a plurality of resources in the network, a categorizing module configured to form a plurality of groups of the plurality of resources based on similar cost attributes and chargeback cost policies at different levels of the hierarchy, a first monitoring module configured to monitor resource use for the plurality of resources, a second monitoring module configured to monitor resource costs based on an agreed to cost structure, and a chargeback cost allocation module configured to allocate costs for each enterprise data center by allocating the cost for resources at each hierarchy level independently using chargeback policies defined for the resources at that hierarchy level.

In one embodiment of the invention, the chargeback cost allocation module is further configured to allocate chargeback costs based on user-defined cost-allocation policies where a chargeback rate is proportional to a level of usage by individual user. In another embodiment of the invention, the chargeback cost allocation module is further configured to allocate chargeback costs by utilizing a weighted demand-based costing scheme that associates user-defined weights to different resources to compute cost allocation. In yet another embodiment of the invention, the categorizing module is further configured to group together resources with similar cost attributes and chargeback policies representing costs at various levels of the hierarchy. In still another embodiment of the invention, the chargeback cost allocation module determines final cost allocation using a hierarchy of different chargeback policies. In one embodiment of the invention, the different chargeback policies comprise: cost allocation based on an agreed to cost structure, cost allocation based on an amount of provisioned resources, cost allocation based on actual volume usage, cost allocation based on usage and availability trends, where the trends are based on time of day and supply and demand for resources, and cost allocation based on an ability to access resources.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation, including meanings implied from the specification as well as meanings understood by those skilled in the art and/or as defined in dictionaries, treatises, etc.

The description may disclose several preferred embodiments for a system and method for chargeback cost allocation in an information technology (IT) system including multiple resources, as well as operation and/or component parts thereof. While the following description will be described in terms of chargeback allocation, for clarity and to place the invention in context, it should be kept in mind that the teachings herein may have broad application to all types of systems, devices and applications.

The invention provides for chargeback cost allocation in an information technology (IT) system including multiple resources. The method includes categorizing cost attributes of different resources into multiple levels defining a cost attribute hierarchy, defining different chargeback groups for resources with similar cost attributes and chargeback policies at different levels of the hierarchy, and performing chargeback cost allocation by allocating the cost for resources at each hierarchy level independently using chargeback policies defined for the resources at that hierarchy level.

Figure 3:
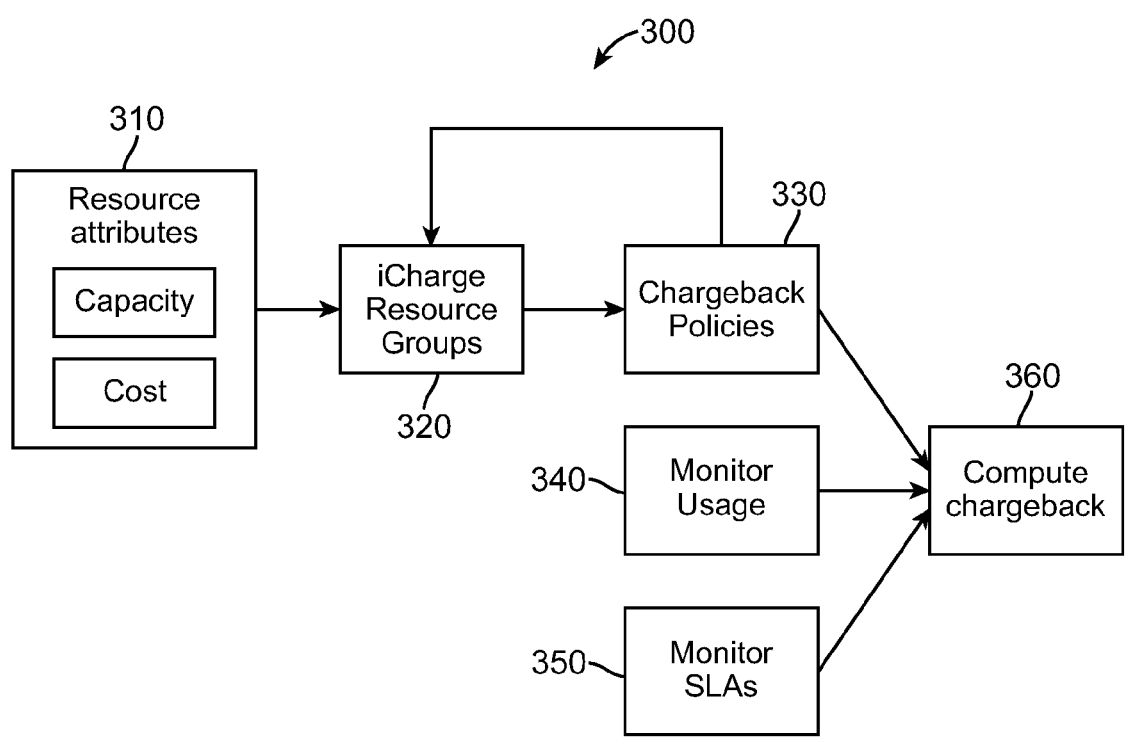
FIG. 3 illustrates a block diagram of a information technology (IT) chargeback allocation system according to an embodiment of the invention.

FIG. 3 illustrates chargeback allocation system 300 according to one embodiment of the invention. In one embodiment of the invention, system 300 includes a build module 310, a categorizing module 320, a chargeback policy module 330, a first monitoring module 340, a second monitoring module 350 and a chargeback cost allocation module 360. In one embodiment of the invention, the build module 310 is configured to gather capacity and cost attributes of each resource and form a cost attribute hierarchy (e.g., a tree-based model). In one embodiment of the invention, in the hierarchy, resources with similar chargeback policies are grouped together by the categorizing module 320.

In one embodiment of the invention, the categorizing module 320 is configured to form multiple levels defining a hierarchy based on a various cost attributes of IT resources in a network. In another embodiment of the invention, the categorizing module is configured to form multiple groups of the IT resources based on similar cost attributes and chargeback cost policies at different levels of the hierarchy. In one embodiment of the invention, the first monitoring module 340 is configured to monitor resource use for the IT resources and the second monitoring module is configured to monitor resource costs based on an agreed to cost structure (e.g., from SLAs). In one embodiment of the invention, the chargeback cost allocation module 360 is configured to allocate costs by allocating the cost for IT resources at each hierarchy level independently using chargeback policies defined for the IT resources at that hierarchy level.

In the attribute hierarchy, at the lowest levels (leaf nodes) are the actual IT resources, which may be associated with zero or more unit (e.g., direct costs, transactions, etc.), batch (e.g., set-up, scheduling, inspecting, etc.) or customer-level (e.g., buying special hardware/software, etc.) costs. At the second-level, IT resources with common chargeback policies are combined to form a chargeback group/container, which may have its own costing policies that should be charged to the users of one of its children IT resources. In other embodiments, other specialized groups can be defined, which captures the common cost of many other chargeback groups or IT resources. At the top-level, the data center or enterprise center chargeback group defines facility-wide cost policies, such as plant management, building maintenance, facility costs, etc.

Figure 4A:
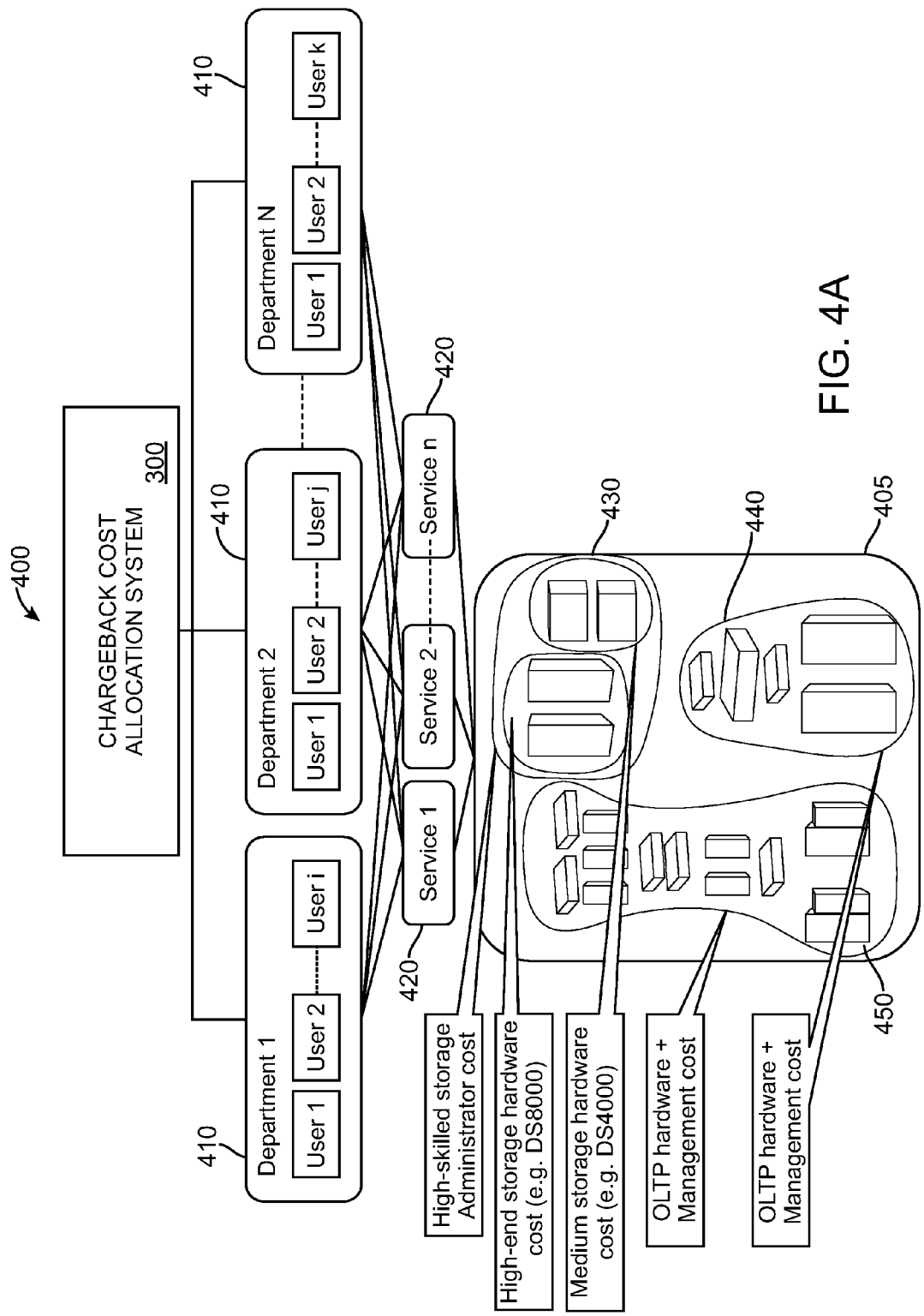
FIG. 4A illustrates an enterprise system including an IT chargeback allocation system showing an example of resource grouping according to an embodiment of the invention.
Figure 4B:
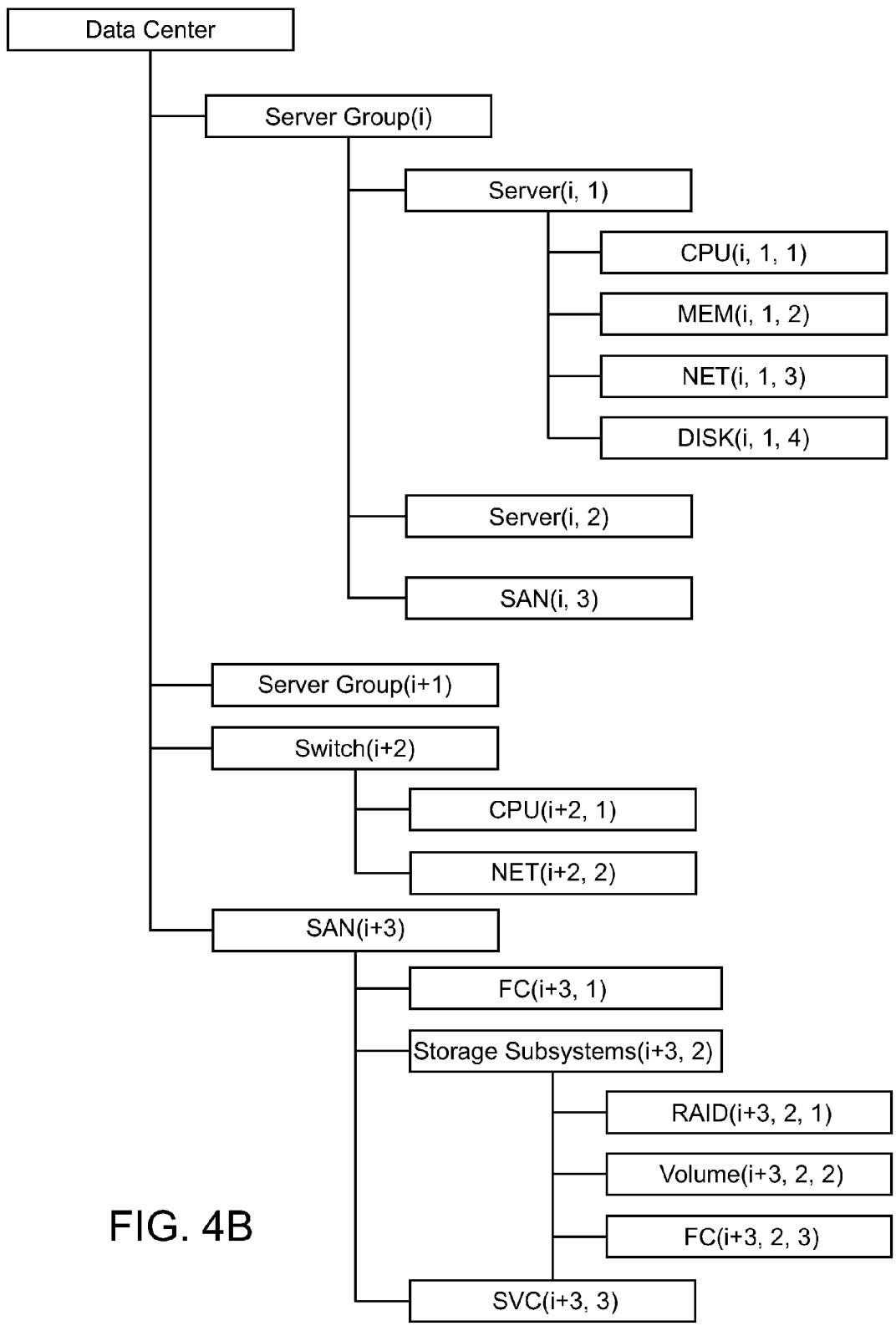
FIG. 4B illustrates a grouping hierarchy for the example of grouped resources shown in FIG. 4A.

FIG. 4A-B illustrates an example of a chargeback hierarchical framework according to one embodiment of the invention. Note that in this example, different types of hardware are shown to be grouped together in the same group (Server Group$_i$). In one embodiment of the invention, the acquisition and management costs of IT resources that are otherwise difficult to capture are encapsulated. Each chargeback group in the hierarchy is also annotated with the list of IT resources that they contain, and their provisioning and run-time usages. The chargeback policies can be set by default or manually specified by the administrator of the system or network.

FIG. 4A illustrates system 300 as part of an enterprise system 400, including an example of grouped resources 430, 440 and 450 in a system 405. Different departments 1-N 410 include a plurality of multiple users each. Different services 1-$n$ 420 are provided to the departments 1-N 410, such as internet service, local area network (LAN service, communication service, etc. In this example of grouping resources, group 430 costs include high-skilled storage administrator costs and medium storage hardware costs. Group 450 includes server costs and administration costs. Group 450 costs include online transaction processing (OLTP) hardware and management costs. Devices in the groups also may include switches, CPUs, storage units that include physical memory and logical memory and client devices. FIG. 4B illustrates a hierarchy for the example groups and associated cost attributes obtained from the enterprise system 400 illustrated in FIG. 4A that is created by the categorizing module 320.

Figure 1:
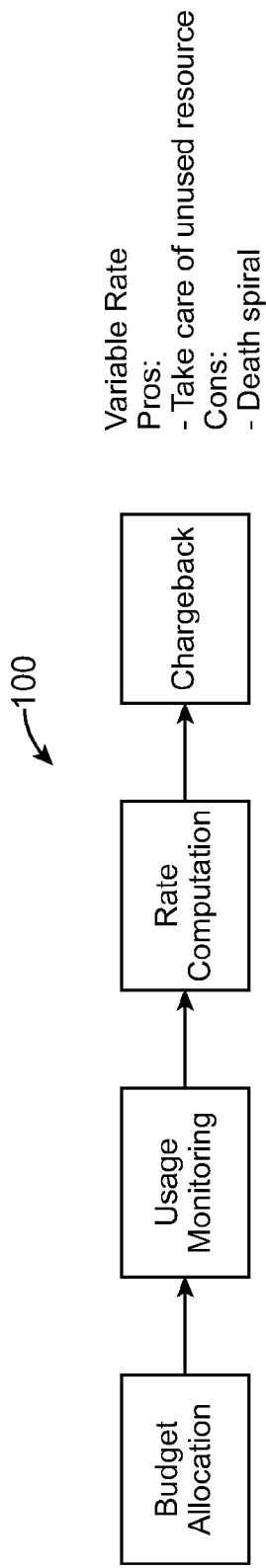
FIG. 1 illustrates a known variable rate chargeback allocation process.
Figure 2:
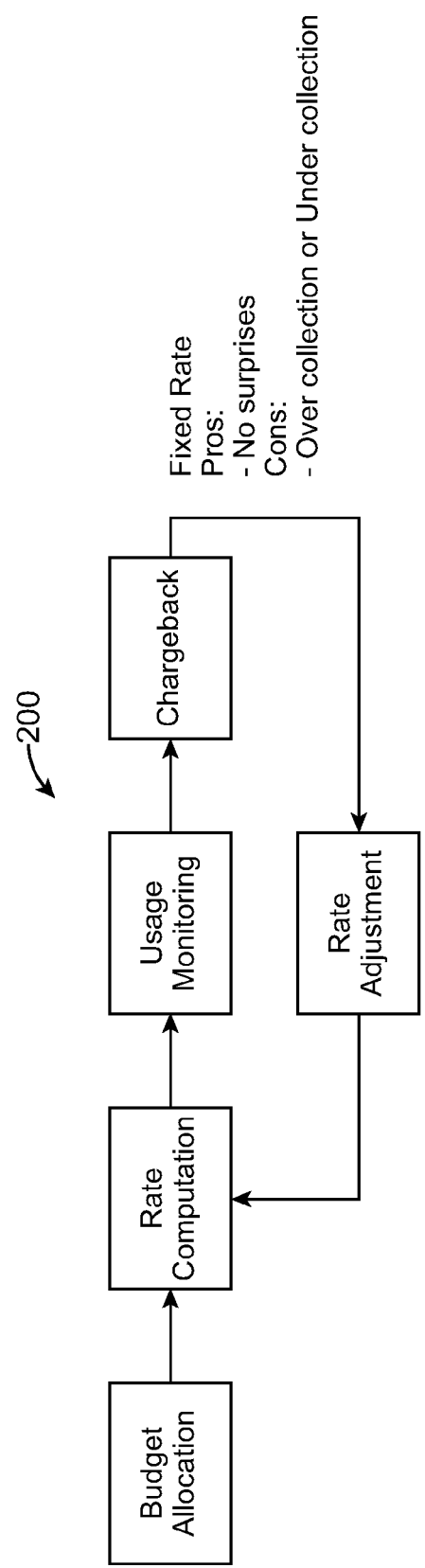
FIG. 2 illustrates a known fixed rate chargeback allocation process.

Current tools rely on some linear combinations of usage metrics to compute cost allocation. If the resources are 100% utilized or 100% provisioned, it is comparatively easier to perform cost allocation based on such linear formulations. A problem arises when some of the resources are left unused and allocating their costs to some users becomes non-trivial. Unused resources are fairly common in enterprise data centers, which are typically over-provisioned to meet the peak demands of its users. The variable and fixed rate scheme shown in FIGS. 1 and 2 can lead to unfair cost allocation and inefficient resource usage when the proportion of unused resources is large. In order to solve these issues, one embodiment of the invention referred to as hot-spot based chargeback and demand-based chargeback allocates cost based on the following equations:

$$r_1 \propto \frac{v_t}{V} \qquad \text{Eq. 1}$$

$$C = \int_0^V r_t dv = k \cdot \int_0^V \frac{v_t}{V} dv = \frac{k}{2} \cdot V \qquad \text{Eq. 2}$$

$$r_t = \frac{2C}{V^2} \cdot v_t \qquad \text{Eq. 3}$$

Where $r_t$ is the rate at time instance 't', $v_t$ is the volume of the usage of a particular IT resource at time instance 't', V is the total volume of the IT resource, C is the total chargeback cost, and k is an integral constant.

The above equations state that the rate ($r_t$) is proportional to the level of usage by individual user. If a resource is heavily used (i.e., it becomes a hot-spot), its rate per unit usage also increases. In this embodiment of the invention, the goal is to reward the user for lower usage and penalize them for high volume usage, therefore giving a useful tool to the system administrators to regulate the usage of their IT resources. If the same resource is used by more than one user concurrently, we use the following cost allocation equations to take care of the increased demand. The values of rate ($r_t$) is computed online by observing the usage data from individual resources as monitored by the first monitoring module 340.

$$r_t \propto \frac{v_t n_t}{V} \qquad \text{Eq. 4}$$

$$C = \sum_T r_t \cdot v_t = \frac{k}{V} \cdot \sum_T n_t \cdot [v_t]^2 \qquad \text{Eq. 5}$$

Where $n_t$ is the number of users using a particular IT resource at time instance 't' and rest of the variables has the same meaning as the previous equations.

The above cost allocation policies implicitly assume that the cost (C) of every IT resource is known. In reality, however, enterprise users pay for servers, storage hardware, etc. and not for individual CPUs, memory, volumes, etc. These low-level resources (contained in a larger system) are multiplexed across different users and workloads. In order to allocate cost of these resources, one embodiment of the invention uses a weighted demand-based costing scheme that associates user-defined weights to different resources to compute cost allocation:

$$r_1 \propto \frac{v_1 n_1}{V_1} \quad r_2 \propto \frac{v_2 n_2}{V_2} \quad \ldots \quad r_m \propto \frac{v_m n_m}{V_m} \qquad \text{Eq. 6}$$

$$C = \sum_i \sum_t r_{i,t} \cdot v_{i,t} \qquad \text{Eq. 7}$$

$$= \sum_i \frac{k_i}{V_i} \cdot \sum_t n_{i,t} \cdot [v_{i,t}]^2 \qquad \text{Eq. 8}$$

Where $r_i$ is a rate for ith IT resource and i ranges from 1 to m, where m is a positive integer. $r_{i,t}$ is rate for ith IT resource at time instance t. $v_{i,t}$ is the usage of the ith IT resource at time instance t; $n_{i,t}$ is the number of users using the ith IT resource at time instance; $k_i$ is a resource and chargeback dependent constant for ith IT resource.

Figure 5:
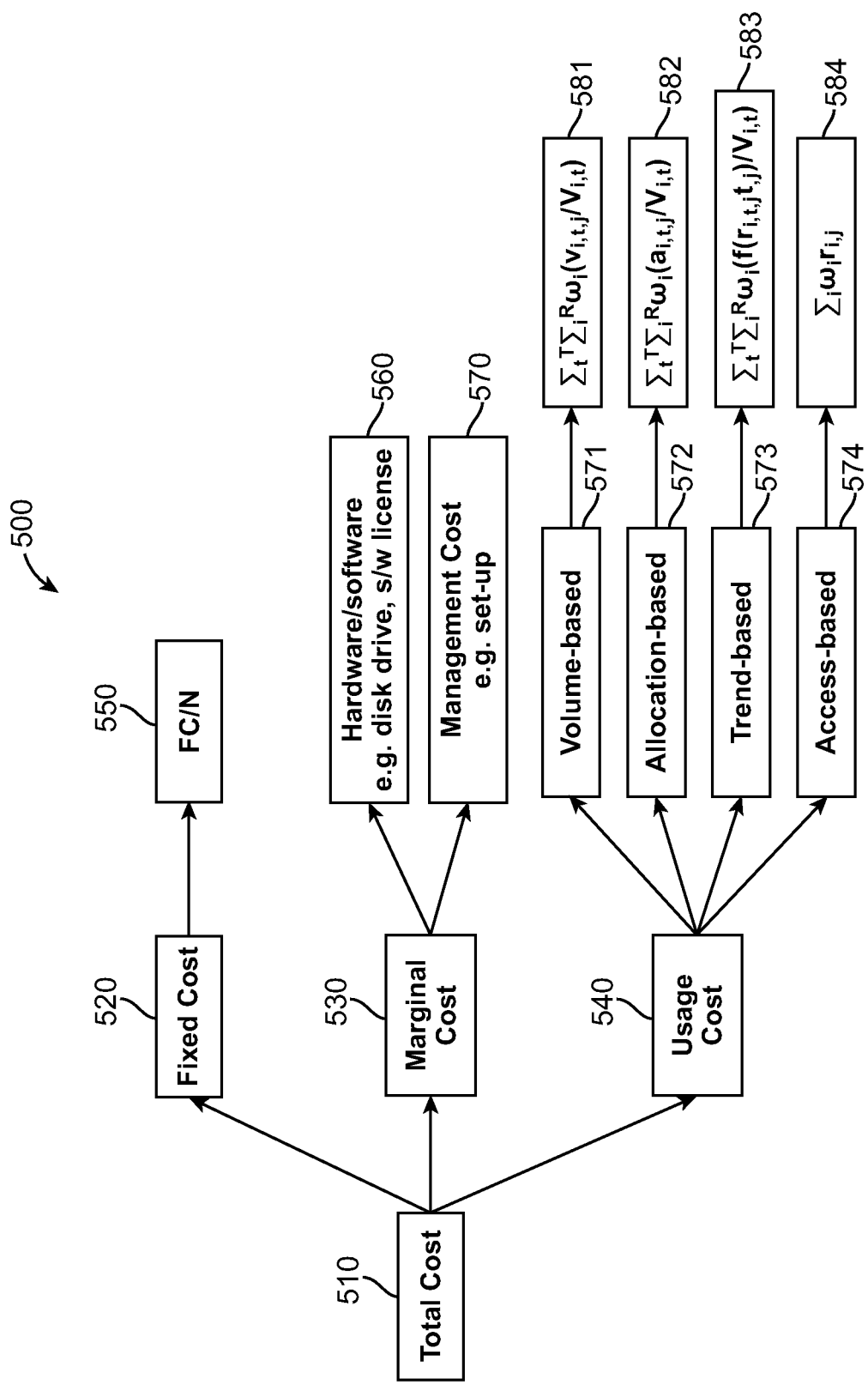
FIG. 5 illustrates a chargeback policy hierarchy according to an embodiment of the invention.

In one embodiment of the invention, the final or total cost allocation 510 would be determined by the chargeback cost allocation module 360 using a hierarchy of policies as illustrated in FIG. 5. In one embodiment of the invention, different expenses are categorized as fixed cost 520, marginal cost 530 and usage-based cost 540. Fixed costs 520 constitute center-wide costs, such as facility, maintenance, etc., and are incurred even if none of the resources are used. These are allocated either equally (i.e., FC/N 550) or in some weighted proportions between different end-users or department.

Marginal costs 530 are incurred for accommodating additional workload, or end-user or customer. These may constitute several different costs, such as the hardware cost (e.g., adding a new disk array), software license costs and management costs (e.g., setting-up infrastructure and configurations for batch operations, etc.). Marginal costs 530 are allocated directly to the party responsible for it through costs 560 and 570. A large fraction of the total costs 520 is allocated based on the usage patterns, which can be classified as one of the follows:

Provisioning-based 572 using formula 582: Cost allocation is determined by the chargeback allocation module 360 based on the amount of provisioned/allocated resources:

$$C_u = \sum_r^R C_r \cdot \sum_m^M \omega_{r,m} \cdot \frac{\rho_{r,m,u}}{V_{r,m}}, \qquad \text{Eq. 9}$$

where $C_u$ is the allocation for user u, R is the set of provisioned resources, $C_r$ is the cost of resource r, M is the set of metrics used to allocate cost incurred by R, $\omega_{r,m}$ is the weighted contribution to $C_r$ by metric $\rho_{r,m,u}$ is the volume of resource r provisioned for user u and V is the capacity of the metric m belonging to resource of type r. An example policy would be to recover 80% cost of a server based on the provisioning of its CPU and 20% based on its network I/O bandwidth provisioning.

Volume-based 571 using formula 581: This is same as the allocation former policy, except that the cost allocation is determined by the chargeback allocation module 360 based on actual usage. Run-time monitoring keeps track of all the resource usages and the allocation is done based on the fractional utilization of practical capacity.

$$C_u = \sum_r^R C_r \cdot \sum_m^M \omega_{r,m} \cdot \frac{V_{r,m,u}}{V_{r,m}}, \quad \text{Eq. 10}$$

where 'v' indicates the actual usage and rest of the parameters remain the same.

Trend-based 573 using formula 583: Cost allocation is determined by the chargeback allocation module 360 based on usage and availability trends and not just on aggregated consumption. This policy takes into account the time of the day as well as demand and supply of the resource. For example, nightly backups cost less than instantaneous backups.

$$C_u = \sum_r^R C_r \cdot \sum_m^M \omega_{r,m} \cdot f(v_{r,m,u} V_{r,m}, t), \quad \text{Eq. 11}$$

where the function 'f' computes the trend of usage and availability.

Access-based 574 using formula 584: This is the simplest policy where cost allocation is determined by the chargeback allocation module 360 based just on the ability to access. This usually applies to cost due to access to specialized service, software license, etc.

$$C_u = \sum_r^R \frac{C_r}{N_r}, \quad \text{Eq. 12}$$

where $C_r$ is the cost of resource 'r' and $N_r$ is the number of users/departments having access to resource r.

The policies defined above are not exclusive and the embodiments of the invention can be extended using custom allocation methods. For example, in one embodiment of the invention, special policies are built in the chargeback policy module 330 for subscription-based (i.e., bundles of services) usage or for tiered-usage (i.e., range of usages) or for providing special quality of service (such as redundancy in the fabric, availability guarantees, etc.). In one embodiment of the invention, chargeback attributes are specified for every cost in the chargeback hierarchy. A policy for the resource group higher up in the hierarchy can subsume the entire child IT resources, in which case individual policies for subsumed IT resources are not required. In another embodiment of the invention, children IT resources have their own specialized chargeback policies for the cost incurred at their particular level.

Figure 6:
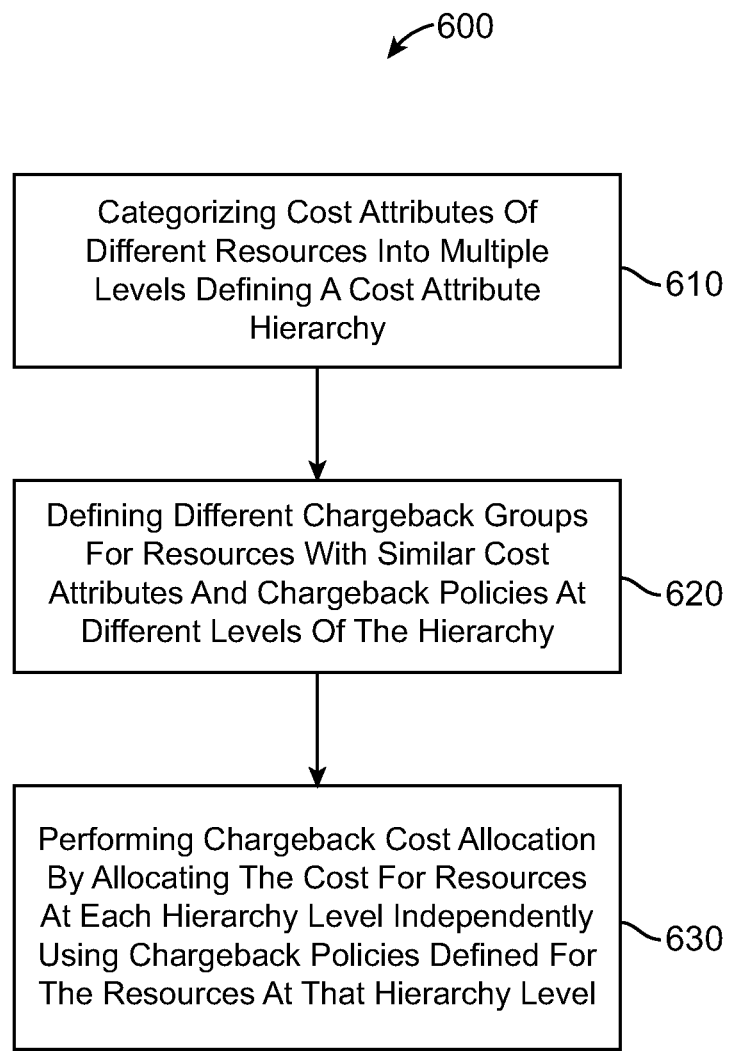
FIG. 6 illustrates a block diagram of an IT chargeback allocation process according to an embodiment of the invention.

FIG. 6 illustrates a block diagram of a process 600 for chargeback cost allocation in an information technology (IT) system including multiple resources. In block 610 cost attributes of different resources are categorized into multiple levels defining a cost attribute hierarchy. In block 620, different chargeback groups for resources with similar cost attributes and chargeback policies are defined at different levels of the hierarchy. In block 630, chargeback cost allocation is performed by allocating the cost for resources at each hierarchy level independently using chargeback policies defined for the resources at that hierarchy level.

In one embodiment of the invention, in block 630 performing chargeback cost allocation includes performing cost allocation based on user-defined cost-allocation policies wherein chargeback rate is proportional to a level of usage by individual user. In another embodiment of the invention, in block 630 performing chargeback cost allocation includes utilizing a weighted demand-based costing scheme that associates user-defined weights to different resources to compute cost allocation.

In one embodiment of the invention, process 600 further includes associating cost attributes with the resources and then categorizing cost attributes of different resources into multiple levels defining a cost attribute hierarchy. In one embodiment of the invention, in block 620, defining different chargeback groups further includes grouping together resources with similar cost attributes and chargeback policies representing costs at various levels of the hierarchy.

In another embodiment of the invention, in block 630, a final cost allocation is determined using a hierarchy of different chargeback policies. In one embodiment of the invention, the different chargeback policies comprise: cost allocation based on an agreed to cost structure, cost allocation based on an amount of provisioned resources, cost allocation based on actual volume usage, cost allocation based on usage and availability trends, where the trends are based on time of day and supply and demand for resources, and cost allocation based on an ability to access resources.

Figure 7:
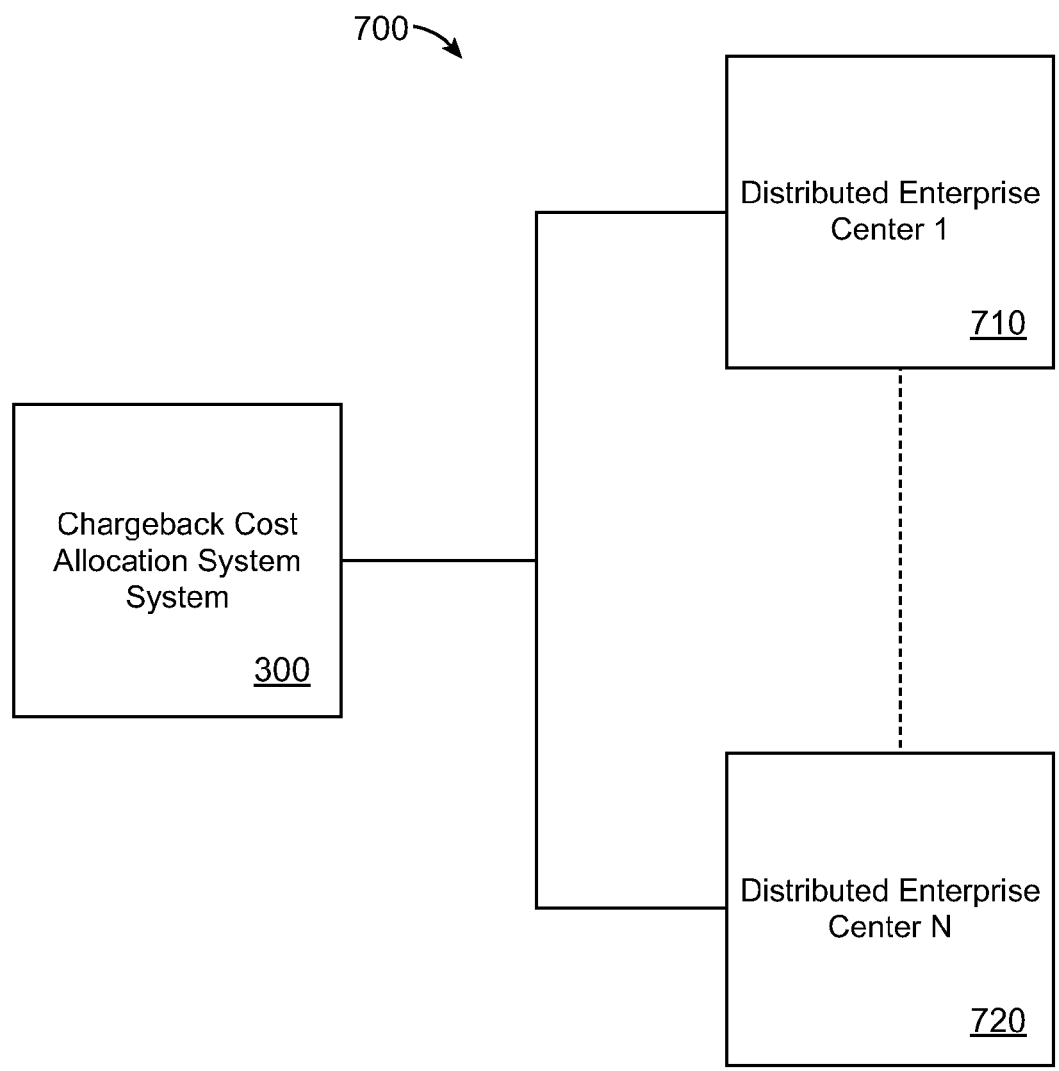
FIG. 7 illustrates a distributed enterprise center network including an IT chargeback allocation system according to an embodiment of the invention.

FIG. 7 illustrates a distributed system 700 according to one embodiment of the invention. In one embodiment of the invention, the system 700 is a distributed network, including a plurality of distributed enterprise or IT centers 1 710 to N 720 and chargeback allocation system 300. In this embodiment of the invention, the distributed enterprise or IT centers 1 710 to N 720 each use the chargeback allocation 300 to allocate chargeback costs for various departments, users, particular enterprise centers, etc.

The embodiments of the invention have advantages over prior administration assistance by having all of the current/past information indexed and mapped to create a knowledge base of administration issues. As problems are tracked with all of the system information, future system administration issues can readily be addressed through the knowledge base 150, workflow mapping module 130 and meta information module 140. Through an easy search term query, system administrators will be able to make key decisions quicker than using prior art monitors.

The embodiments of the invention, and any modules discussed can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device.

The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read only memory (CD-ROM), compact disk-read/write (CD-R/W) and DVD.

I/O devices (including but not limited to keyboards, displays, pointing devices, etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other modifications may occur to those ordinarily skilled in the art.

What is claimed is:

1. A method for chargeback cost allocation in an information technology (IT) system including multiple resources, the method comprising:
   using a hardware processor for:
   monitoring system resource usage and categorizing cost attributes of different resources into multiple levels defining a cost attribute hierarchy;
   defining different chargeback groups for the resources with similar cost attributes and associated chargeback policies at different levels of the cost attribute hierarchy; and
   performing chargeback cost allocation based on user-defined cost-allocation policies by allocating a cost for the resources at each hierarchy level of the cost attribute hierarchy independently using chargeback policies defined for the resources at a particular hierarchy level of the cost attribute hierarchy, wherein chargeback rate r is at time t is represented as $r_t \propto v_t/V$, where v represents volume of usage for a particular resource and V represents total volume of the particular resource, wherein performing chargeback cost allocation comprises:
   using the hardware processor for computing cost allocation based on monitoring usage data from individual resources monitored, wherein a final cost allocation is determined using a hierarchy of different chargeback policies, and total chargeback cost C is represented as $$C = \int_0^V r_t dv = k \cdot \int_0^V \frac{v_t}{V} dv = \frac{k}{2} \cdot V,$$

where k is an integral constant.

2. The method of claim 1, wherein performing chargeback cost allocation includes performing cost allocation based on user-defined cost-allocation policies wherein chargeback rate is proportional to a level of usage by individual user, wherein the chargeback rate is proportional to a volume of usage of a particular resource at a particular time divided by a total volume of the particular resource.

3. The method of claim 1, wherein performing chargeback cost allocation includes utilizing a weighted demand-based costing scheme that associates user-defined weights to the different resources to compute cost allocation, wherein the chargeback rate is proportional to a volume of usage at a particular time, times a number of users using a particular resource at the particular time divided by a total volume of the particular resource.

4. The method of claim 1, further including associating cost attributes with the resources and then categorizing cost attributes of the resources into the multiple levels defining the cost attribute hierarchy.

5. The method of claim 1, wherein defining different chargeback groups further includes grouping together the resources with similar cost attributes and chargeback policies representing costs at various levels of the cost attribute hierarchy.

6. The method of claim 3, wherein usage of the particular resource is regulated by rewarding lower resource usage on an individual basis.

7. The method of claim 6, wherein the different chargeback policies comprise:
   cost allocation based on an agreed to cost structure;
   cost allocation based on an amount of provisioned resources;
   cost allocation based on actual volume usage;
   cost allocation based on usage and availability trends, where the trends are based on time of day and supply and demand for the resources; and
   cost allocation based on ability to access the resources.

8. The method of claim 1, wherein the chargeback rate r is at time t is represented as $$r_t = \frac{2C}{V^2} \cdot v_t.$$

9. A computer program product for allocating chargeback costs in a network including a plurality of resources comprising a non-transitory computer usable medium including a computer readable program, wherein the computer readable program when executed on a computer causes the computer to:

monitor system resource usage and categorize cost attributes of different resources into multiple levels defining a cost attribute hierarchy;

define different chargeback groups for the resources with similar cost attributes and associated chargeback policies at different levels of the cost attribute hierarchy; and perform chargeback cost allocation based on user-defined cost-allocation policies by allocating a cost for the resources at each hierarchy level of the cost attribute hierarchy independently using chargeback policies defined for the resources at a particular hierarchy level of the cost attribute hierarchy, wherein chargeback rate r is at time t is represented as $r_t \propto v_t/V$, where v represents volume of usage for a particular resource and V represents total volume of the particular resource, wherein chargeback cost allocation comprises:

computing cost allocation based on monitoring usage data from the resources, wherein a final cost allocation is determined using a hierarchy of different chargeback policies, and total chargeback cost C is represented as $$C = \int_0^V r_t dv = k \cdot \int_0^V \frac{v_t}{V} dv = \frac{k}{2} \cdot V,$$

where k is an integral constant.

10. The computer program product of claim 9, wherein the perform chargeback cost allocation includes utilizing a weighted demand-based costing scheme that associates user-defined weights to the resources to compute cost allocation.

11. The computer program product of claim 9, further causing the computer to:

associate cost attributes with the resources and then categorize cost attributes of the resources into the multiple levels defining the cost attribute hierarchy.

12. The computer program product of claim 9, wherein the defined different chargeback groups further includes grouping together the resources with similar cost attributes and chargeback policies representing costs at various levels of the cost attribute hierarchy.

13. The computer program product of claim 9, wherein the different chargeback policies comprise:

cost allocation based on an amount of provisioned resources;

cost allocation based on actual volume usage;

cost allocation based on usage and availability trends, where the trends are based on time of day and supply and demand for the resources; and cost allocation based on ability to access the resources.

14. The computer program product of claim 9, wherein the chargeback rate r is at time t is represented as $$r_t = \frac{2C}{V^2} \cdot v_t.$$

* * * * *